United States Patent [19]

Tega et al.

[11] Patent Number: 4,733,457
[45] Date of Patent: Mar. 29, 1988

[54] APPARATUS FOR THE AUTOMATION OF OPERATIVE SYSTEMS WITH MECHANICAL HAND OR THE LIKE

[75] Inventors: Ezio Tega; Ezio Bazzo, both of Arezzo, Italy

[73] Assignee: Metalmeccanica Gori & Zucchi M.G.Z. S.p.A., Arezzo, Italy

[21] Appl. No.: 823,997

[22] Filed: Jan. 29, 1986

[30] Foreign Application Priority Data

Feb. 4, 1985 [IT] Italy .................. 9329 A/85
Apr. 17, 1985 [IT] Italy .................. 9386 A/85

[51] Int. Cl.[4] .............................. B23P 21/00
[52] U.S. Cl. ...................... 29/709; 29/720; 279/1 B; 279/75
[58] Field of Search ............. 29/709, 720, 739, 740, 29/741, 833, 834, 854; 279/1 B, 75

[56] References Cited

U.S. PATENT DOCUMENTS

| 3,881,604 | 5/1975 | Eggemeier | 279/75 X |
| 3,932,931 | 1/1976 | Wright | 29/720 X |
| 3,968,555 | 7/1976 | Holt | 29/720 X |
| 4,171,821 | 10/1979 | Miller | 279/75 |
| 4,290,617 | 9/1981 | Yoshida | 279/75 |
| 4,327,483 | 5/1982 | Zemek et al. | 29/741 |
| 4,329,776 | 5/1982 | Mori et al. | 29/741 |
| 4,464,833 | 8/1984 | Duncan | 29/709 X |
| 4,499,800 | 2/1985 | Stahl | 279/75 X |
| 4,510,683 | 4/1985 | Fedde et al. | 29/709 X |
| 4,611,397 | 9/1986 | Janisiewicz et al. | 29/834 |

Primary Examiner—P. W. Echols
Attorney, Agent, or Firm—Hopgood, Calimafde, Kalil, Blaustein & Judlowe

[57] ABSTRACT

The mobile hand or mechanical hand is operated by a power system for driving the operative tool, and a sensor device is provided concordantly acting with the power system but having limited power, which is associated with a sight to determine a consensus to the activation of the power system when—in the absence of contrasts due to positioning irregularity of the component to be applied—said sensor device imposes an initial displacement of the same component.

8 Claims, 24 Drawing Figures

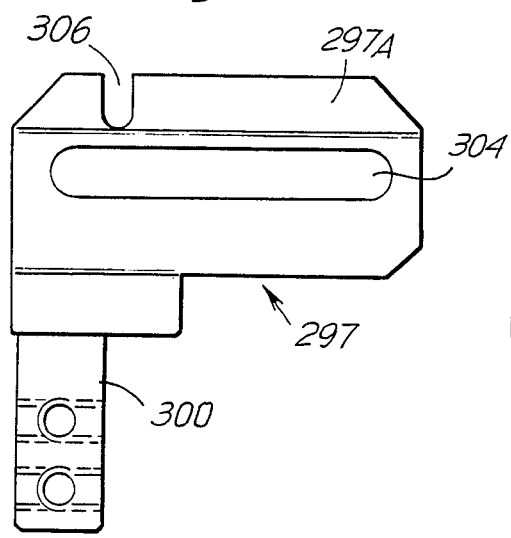
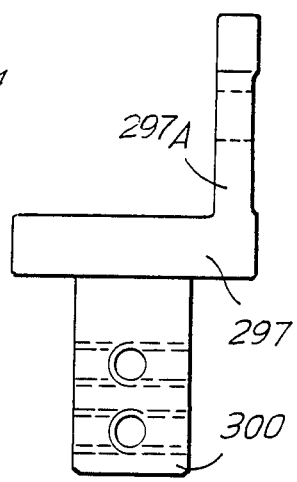
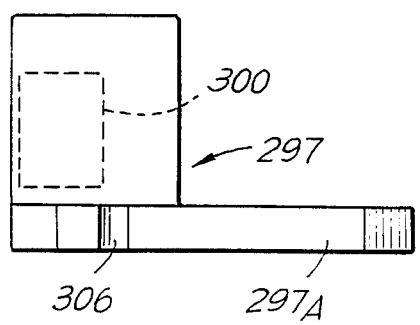

APPARATUS FOR THE AUTOMATION OF OPERATIVE SYSTEMS WITH MECHANICAL HAND OR THE LIKE

DESCRIPTION

The invention relates to an apparatus for handling and assembling electronic components and for other equivalent uses, comprising a mobile hand to which a device with a mobile operative tool can be applied to carry out the operation, a power system being provided to drive the operative tool.

According to the invention, the apparatus comprises a sensor device concordantly acting with the power system but with limited power, which is associated with a sight to determine a consensus to the actuation of the operation respectively to the activation of the power system when—in the absence of irregularities for lack, or selection, or positioning of the component to be applied—said sensor device cooperates with the sight in a programmed way.

The sensor device can be predisposed to impose an initial displacement of operative members cooperating with a component to be handled.

The sensor device may comprise a sensor stem acting concordantly with and on the same manoeuvring member of the mechanical hand, upon which the operative system acts as well; said sensor stem being operated by a weak-power drive means.

The sight associated with the sensor device may be an optical sight, or a photoelectric, or magnetic, or electrical or mechanical or other type sight.

The weak-power drive means can act on a lever which pushes the sensor stem and intercepts the sight upon the actuation of an initial displacement of the manoeuvring mobile member.

Said sensor stem may be slidingly housed in the stem—in this case being made tubular—of the piston of the power system.

The apparatus may comprise a pressure sensor interposed between the power system and said manoeuvring member in order to limit the actuation forces.

The apparatus may also comprise a sensor for controlling the presence of the mechanical hand.

The invention may be applied to an improved fixture for blocking a tool on the arm of a robot or for other uses, including a body with a cavity for the shank of a tool provided with a groove, and groove engaging pegs housed into seats radially disposed in respect to said cavity. In this case, the fixture may also comprise a cylinder-annular piston system surrounding said body and able to act through inclined surfaces upon balls forming said engaging pegs. There is thus obtained an assembly of limited overall dimensions but able to assure an effective and safe locking.

In practice, the groove of the tool shank may have an inclined surface upon which the balls act, thereby imposing an axial thrust component which forces the tool against a surface of the fixture body.

Passages provided within the body and the tool may be put into communication to each other upon the axial forced coupling between the body and the tool.

Advantageously, the piston of annular cross section has a coaxial inner cone surface which acts upon the balls.

Said piston is able to cooperate with a limit stop, when a shank to be blocked is not present, thus avoiding an action on the balls and the retaining means of the same balls.

According to another development of the invention, the blocking fixture may comprise sensors for the control and consensus of the piston, of the locking and release of the shank, of the tool presence and of the resistence exibited by an axial stem.

In particular, a sensor is provided cooperating with an appendix of the annular piston for the locking and release of the tool shank.

A proximity sensor may also be provided for evaluating the position of the lever connected to the axial sensor stem inside the power piston.

The fixture may also comprise a proximity sensor, being at the level of the contact surface with the tool body.

The drawing shows practical, non limitative exemplifications in which:

FIGS. 10, 11 and 12 show in three separated views, a slide member carrying the clamp;

Figure 1:
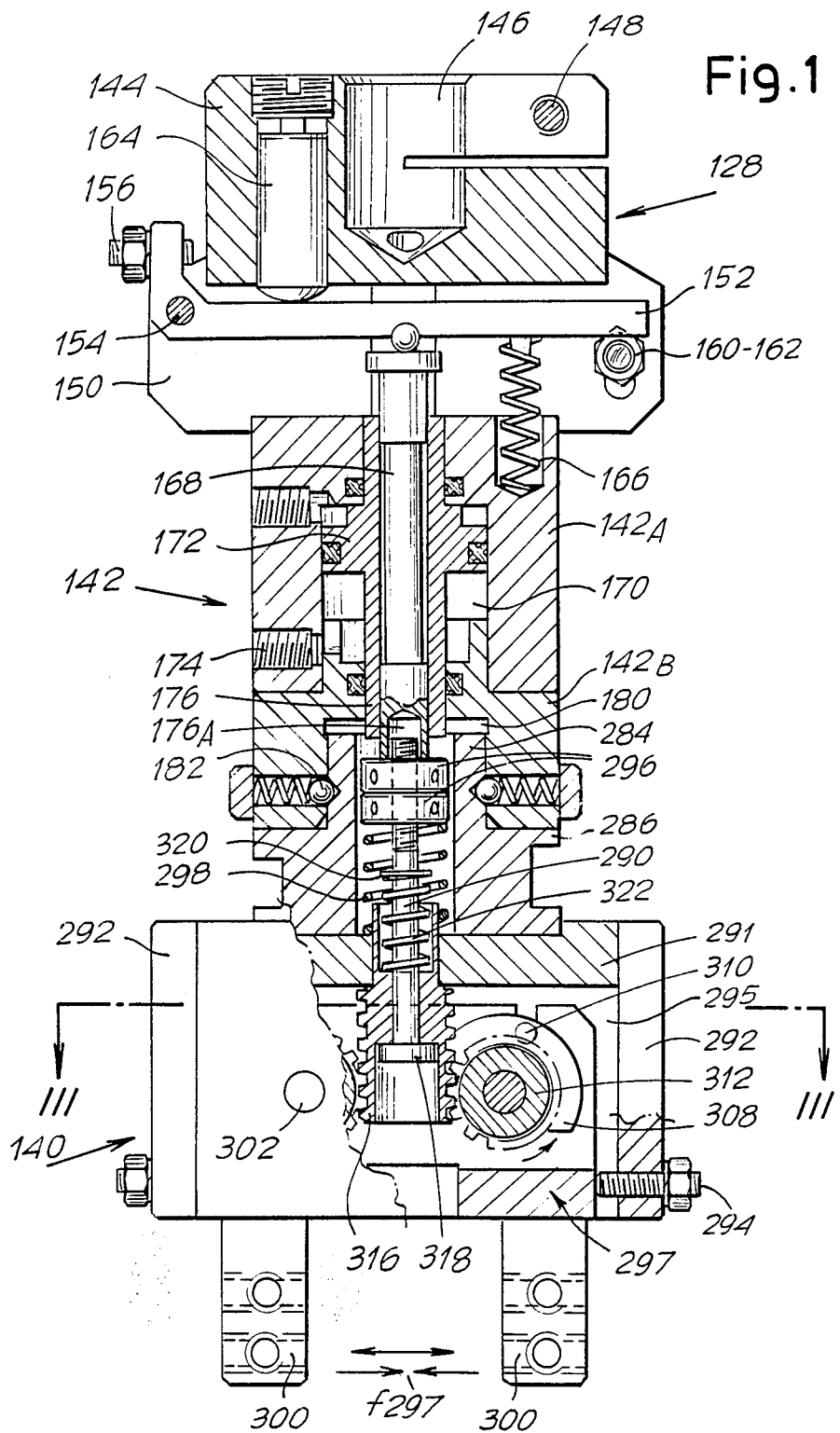
FIG. 1 shows an ensemble view in an axial section of a clamping fixture, with the grip elements divaricating.
Figure 2:
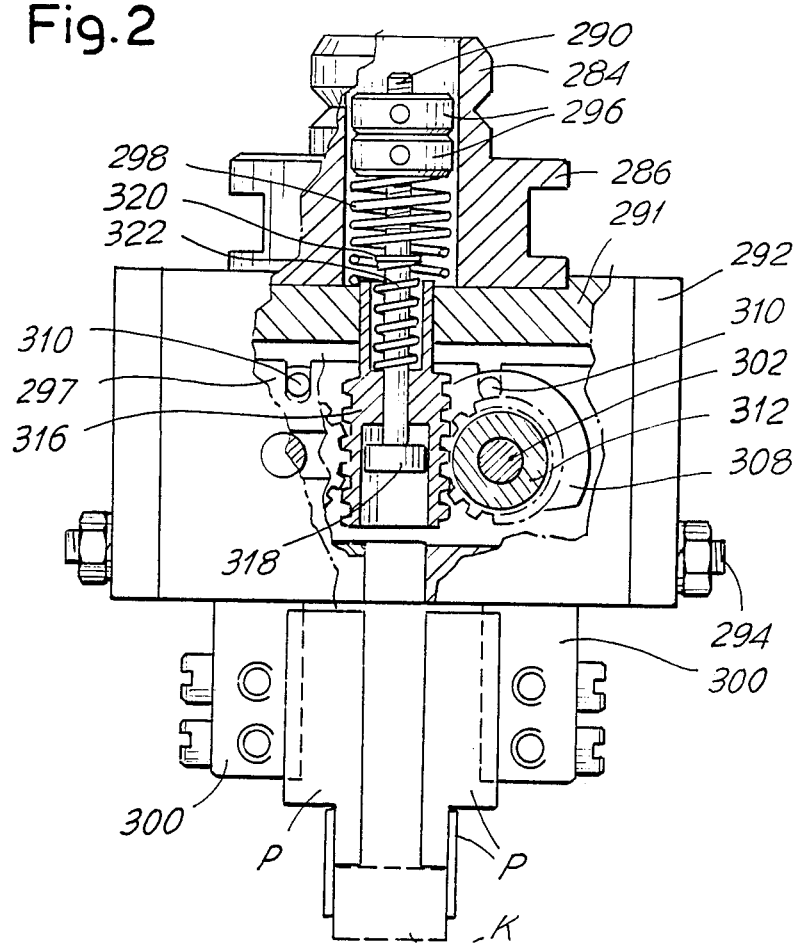
FIG. 2 shows an enlarged detail, with the clamp tightened on a component.
Figure 3:
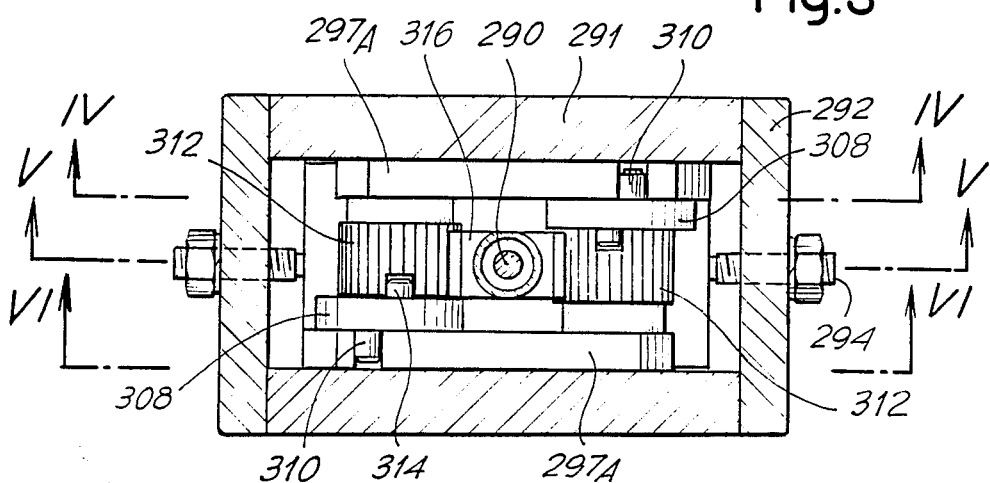
FIG. 3 is a local section on line III—III of FIG. 1.
Figure 4:
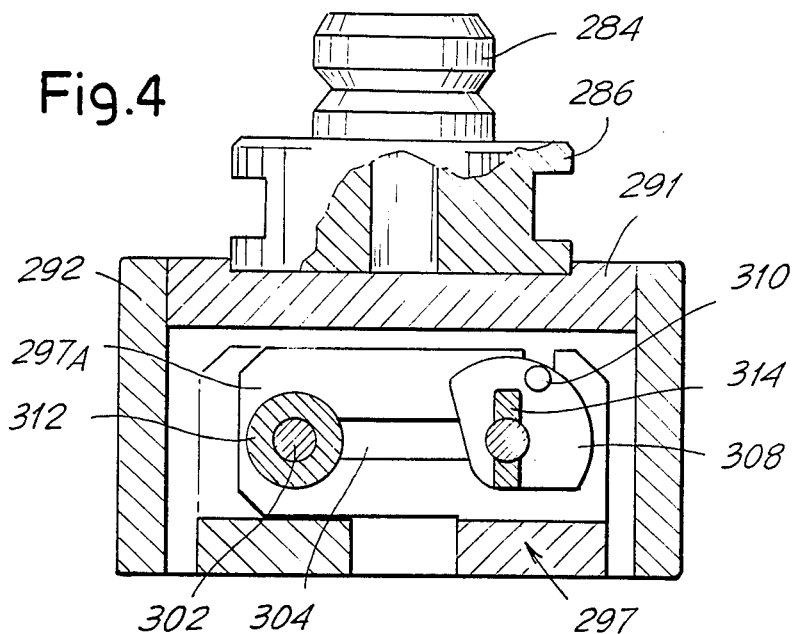
FIGS. 4, 5 and 6 are sections on lines IV—IV, V—V and VI—VI of FIG. 4.
Figure 5:
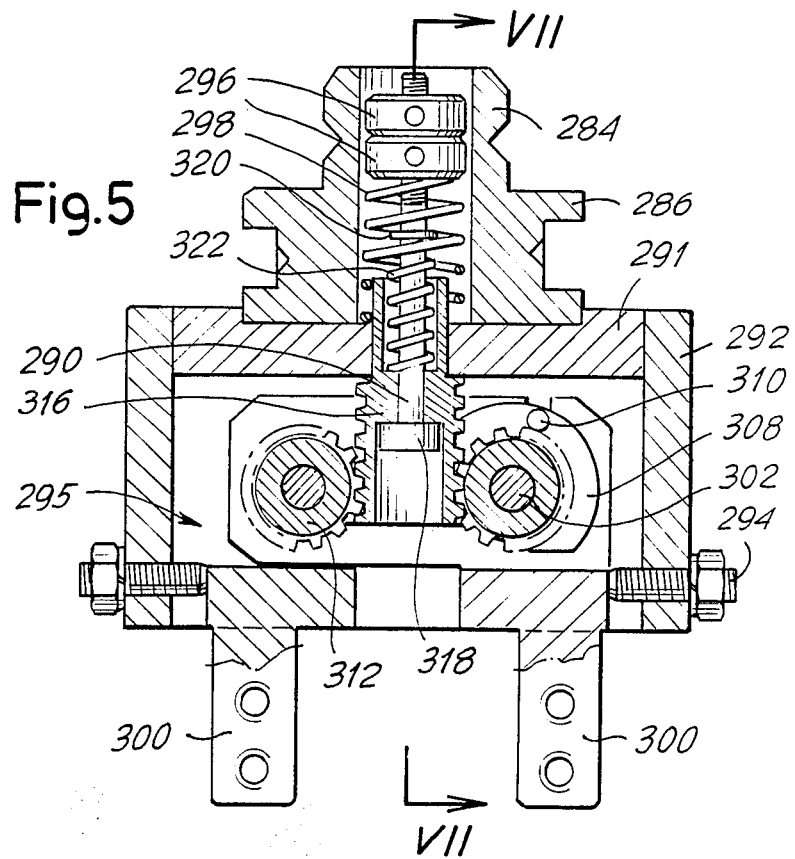
Figure 6:
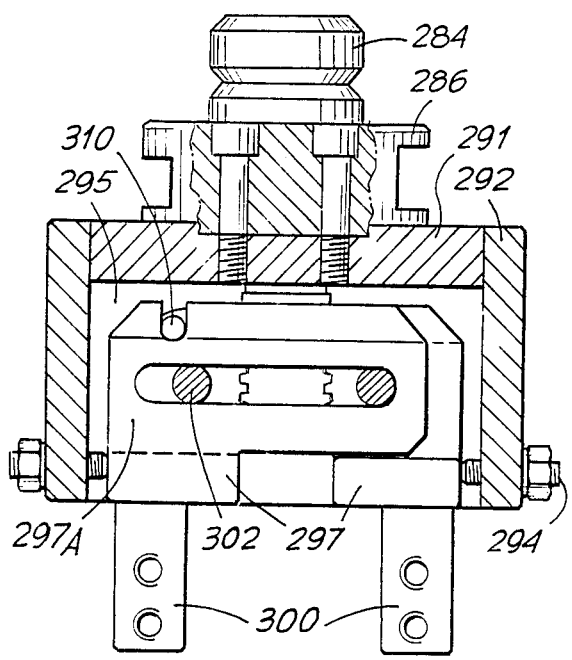
Figure 7:
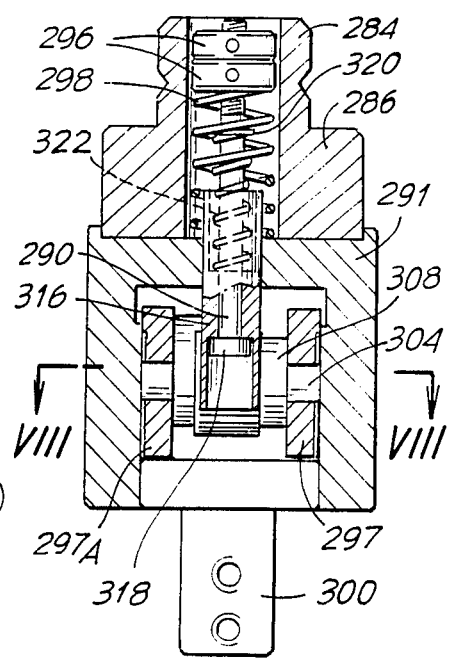
FIGS. 7, 8 and 9 show a section on line VII—VII of FIG. 5 and sections on lines VIII—VIII of FIG. 7 and IX—IX of FIG. 8.
Figure 9:
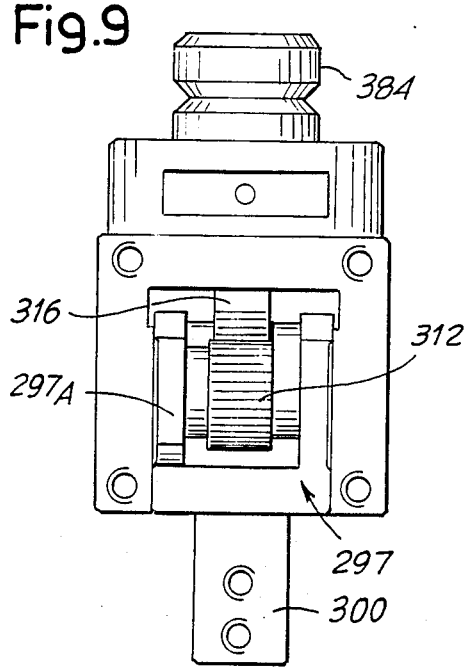
Figure 8:
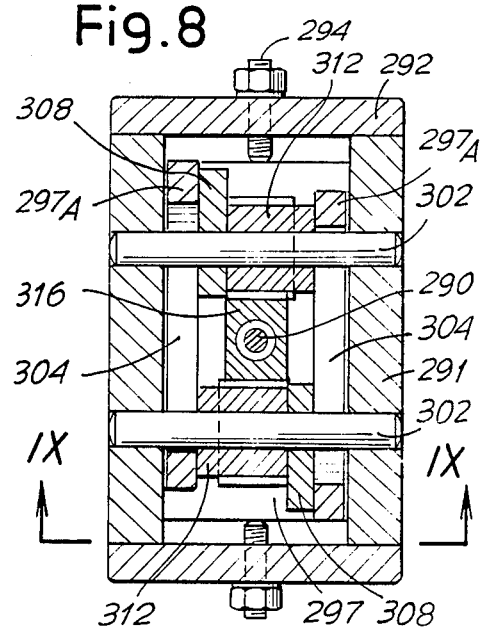

According to what is illustrated in FIGS. 1 to 12 of the attached drawing, numeral 128 indicates a head connected to the manoeuvre arm of a manipulator or "robot"; said head is predisposed to receive a replaceable tool, representing a mobile hand or mechanical hand, generally indicated by 140.

The head 128 comprises a main block 14 and a fitting block 144 assembled between them. The fitting block 144 has a seat 146 for engagement on the end of the robot arm to which said block may be tightened by means, for example, of the tangential screw 148. The block 144 has a diametral slot 150 within which a lever element 152 can move, pivoted at 154 and provided with an adjustable stop member 156. The fitting block 144 forms lugs 158 on which the terminals 160, 162 of an optical sight can be mounted, said sight—of photoelectric, reflection, or magnetic, or electrical, or mechanical or other type—being apt to cooperate with the mobile end of the level element 152 to determine a consensus to be later described in more detail. In the fitting block 144 the cylindrical seat for a small piston 164—hydraulic or pneumatic—is formed, this piston being able to act on the lever element 152 against a weak counteracting spring 166. At an intermediate position, the lever 152 cooperates with the upper end plate of a sensor stem 168 extending inside the main block 142 which is made up of two parts 142A and 142B. The main part 142A of the main block 142 makes up the cylindrical cavity 170 of a double-acting power piston 172 driven through two side connections, one of which is indicated by 174 in the drawing. The stem 176 of the power piston 172 is tubular and slidingly houses the sensor stem 168. Both the lower end of the tubular stem 176 of the power piston 172 and the lower end of the sensor stem 168 reach a seat 180 for the fitting of the replaceable mechanical hand 140; in particular, said fitting seat 180 is provided—according to the drawing—with elastic retention pegs 182 for the shank 284 of a body 286 of the mechanical hand carrying the tool or, anyhow, carrying the operative fixture which can be replaceable on the mechanical hand 140 or with it. In order to signalling the possible failure of grip or the loss of the mechanical hand during the whole work period a sensor is advantageously provided capable of sensing the presence or the absence of the mechanical hand 140 which is to be fitted into the seat 180.

In the body 286 of the mechanical hand a through seat 288 is predisposed longitudinally crossed by a manoeuvre column 290 which drives the operative members of the mechanical hand 140 described herebelow.

The upper end of column 290 is housed in an axial and dead hole 168A of the sensor stem 168. This column 290 is at least partially threaded for engaging an adjustable pawl 296 practically made up of a nut and a lock nut. On the pawl 296 a spring 298, reacting on the body of the mobile or mechanical hand 140, acts from down upwards while, on the adjustable pawl 296—after an adjustable run—both the lower end of the sensor stem 168 and the lower end of the stem 176 of the pwoer piston 172 can act from up downwards. The assembly 290, 296 makes up the manoeuvre member of the mechanical hand.

The shank 284 of the body 286 of the mechanical hand 140 is fitted into the fitting seat 180 of the main block 142 of the head 128. To the body 286 a box housing 291 is engaged being provided with end plates 292 which are, in turn, provided with screw registers 294 intended to limit the opening of the clamp jaws. The housing 291 with plates 292 defines a sliding seat 295 into which two similar slide members 297 can slide, each of them forming one of the jaws 300. These slide members are slidingly guided with their walls 297A against the inner sides of the box housing 291; for the straight line guide of the two slide members 297, according to the double arrows f297, two pivots 302 are provided which go both through the sliding seat 295 and slots 304 formed in the walls 297A of the slide members 297. In the walls 297A, respective open slots 306 are also formed, perpendicular to slots 304.

On the pivots 302 two sectors 308 are idly mounted each one having a peg 310 apt to be housed in the respective open slot 306. On the pivots 302, respective toothed wheels 312 are also idly mounted, which are coupled to the respective sectors 308 through diametral keys 314 and relevant keyways. The two toothed wheels 312 mesh with respective straight-line rack toothings of a rack member 316. This rack member 316 is axially drilled with a passage having two diameters, constituting an abutment for the end head 318 of the column 290. This column 290 has a shoulder 320 formed as an open elastic ring on which a spring 322 rests, which spring reacts on the rack member 316 so as to urge this member in abutment against the head 318.

In order to cause the closure of the clamp, that is, the mutual approach of jaws 300, the column 290 must be lowered by a compression of spring 298. Accordingly, through the shoulder 320 and the spring 322, the rack member 316 is also lowered. This member 316 goes down until resistances to the lowering greater than the thrust exerted through the spring 322 are encountered, after that the rack member 316 stops and only the lowering of the column 290 continues with the head 318 moving away from the abutment made up of the two-diameters hole inside the member 316.

Upon the lowering of the rack member 316, the two toothed wheels 312 are caused to rotate in the direction of the arrows and the two sectors also rotate in the same direction. By the rotation of the two sectors 308, the two pegs 310 engaged in the open slots 306 cause a sliding of the slide members 297 in a symmetrical way and in the direction of mutual approach of the two jaws 300, the two pegs 310 moving according to a sinusoidal law in said open slots 306. The contact is thus obtained of the jaws 300—through the grip elements P (FIG. 2)—on the component K which they must engage. After the contact of jaws 300 with the component has taken place, the column 290 continues its lowering while the rack member breaks off its lowering and there is a further compression of the spring 322 which is responsible of the contact pressure between jaws 300 and the component K engaged by the same jaws; the contact pressure of the jaws is therefore determined only by the characteristics of the spring 322.

By the back stroke of the power piston 172, after a first idle stroke as far as the initial contact of the head 318 with the rack member 316, said rack member is lifted again and thus the slide members 297 are driven by pegs 310 of the sectors 308 in such a direction as to move the clamp jaws 300 away from each other.

The arrangement is such that the power piston 172, intended to accomplish or complete the operation, for example, of the grip and of the application of the component K to a card, comes into action only if a consensus is given by the sight like that indicated by 160, 162.

A consensus may be refused for the absence of a regular piece respectively for the presence of an anomalous, too small piece. After the positioning of the mechanical hand in an operative position—the lever 152 being in the lifted position shown in FIG. 1—the small piston 164 is urged, that tends to lower the lever 152 or help its lowering. Under normal grip conditions, that is, with an initial contact occurring after a limited travel of the clamp, the lever 152 does not reach the sight 160, 162 and in this case, the consensus is given to the continuation of the operation by the tubular stem 176. If the run of the clamp jaws 300 exceeds the calibration limit, the sight is intercepted thereby causing the signalling.

Another consensus can be accomplished by prearranging a system signalling the presence of a component having greater dimensions than a predetermined limit, that may hinder the lowering of the mechanical hand for the programmed extent and/or may hinder the mutual approach of jaws 300 below a calibration limit. In this case, the lever 152 cannot intercept the sight 160, 162 thereby causing the alarm or the stoppage.

In general, the anomalous condition—attained through one of the above criteria indicated—causes, as a consequence, that the consensus to power piston system 170, 172 is not given. The lack of consensus may determine the stopping of the plant, accompanied by possible signallings and/or operations suitable for determining measures consequent upon the detected irregularity.

In some cases, it seens useful to provide a limiting device of the thrust operated by the power piston 172. To this end, a sensor may be interposed between members 296 and 176A capable of detecting a thrust greater than a predetermined calibration limit.

Figure 13:
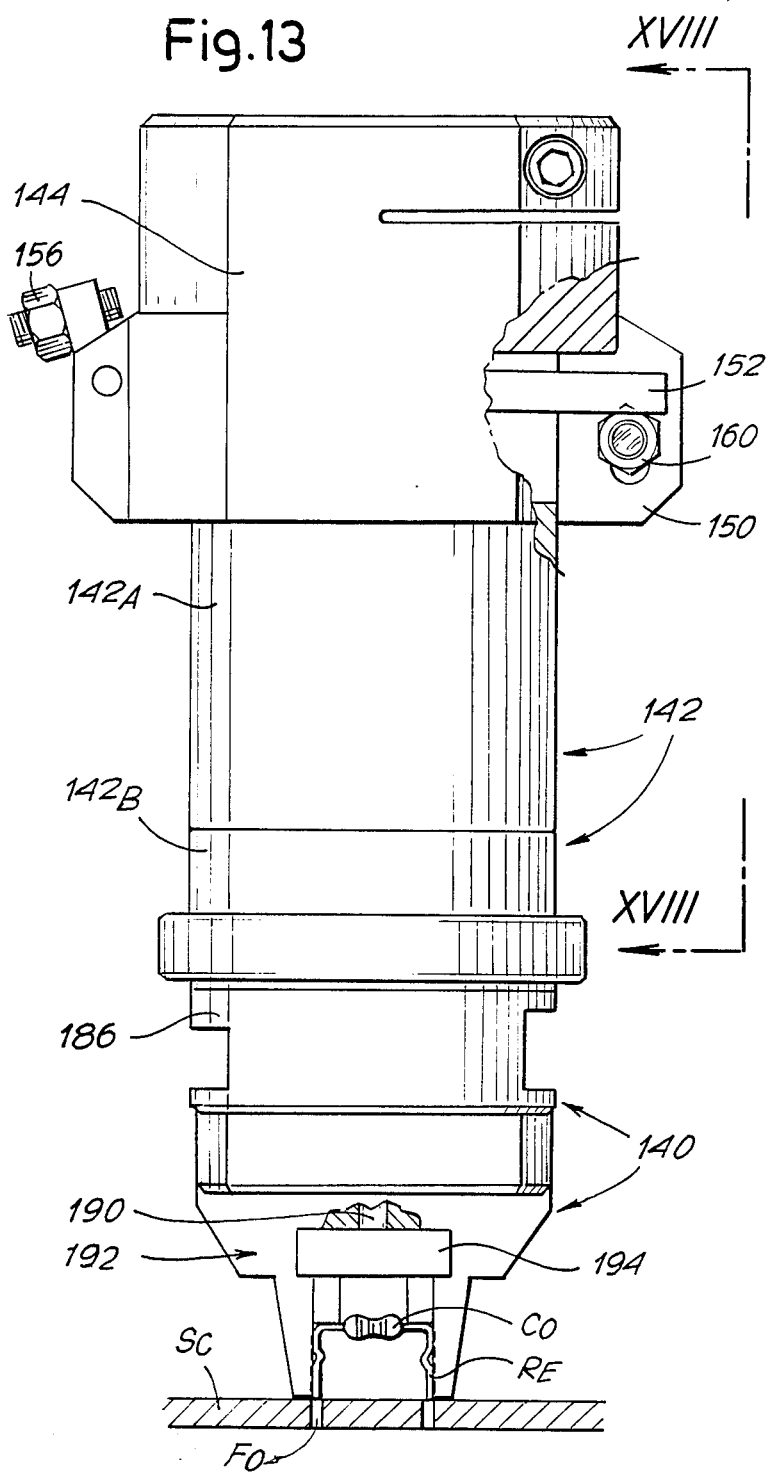
FIG. 13 shows a modified embodiment in an ensemble outside view with some cutaway parts, in the arrangement preceding the beginning of a manoeuvre for the application of a component.

According to the embodiment of FIG. 13 and the following ones, the arrangment of the assembly 142 is similar to the one already described in relation to the previous example. The mechanical hand 140 that is fitted into the seat 180, is different and in the drawing the same members are indicated by the same references as those of the preceding case. Into the fitting seat 180, the shank 184 of a body 186 of the mechanical hand holding the tool, or the operative replaceable fixture, is fitted which in this example is shown as performing an insertion.

Figure 18:
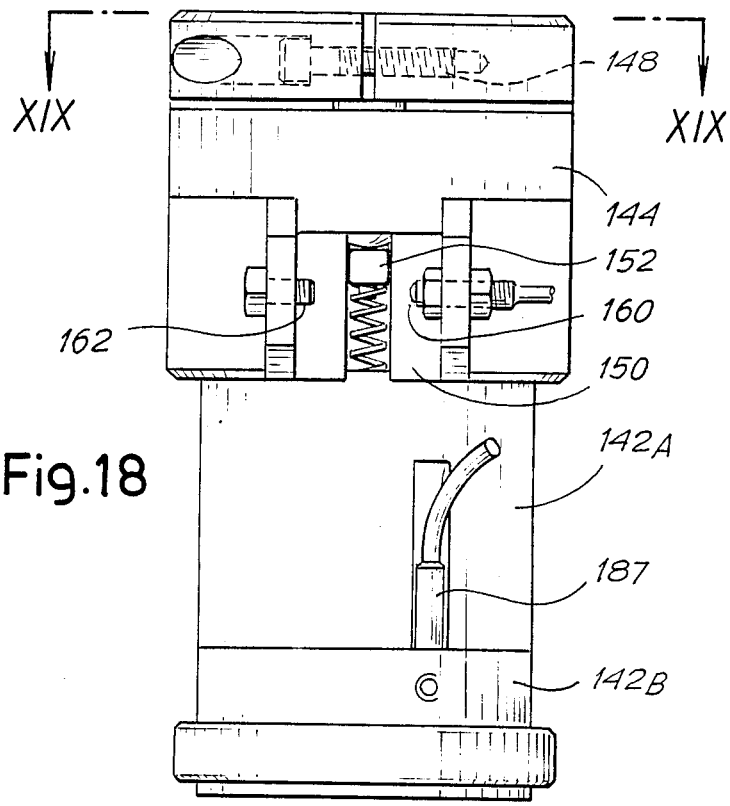
FIGS. 18 and 19 show a view from line XVIII—XVIII of FIG. 13 in reduced dimensions, and a view from line XIX—XIX of FIG. 18.
Figure 19:
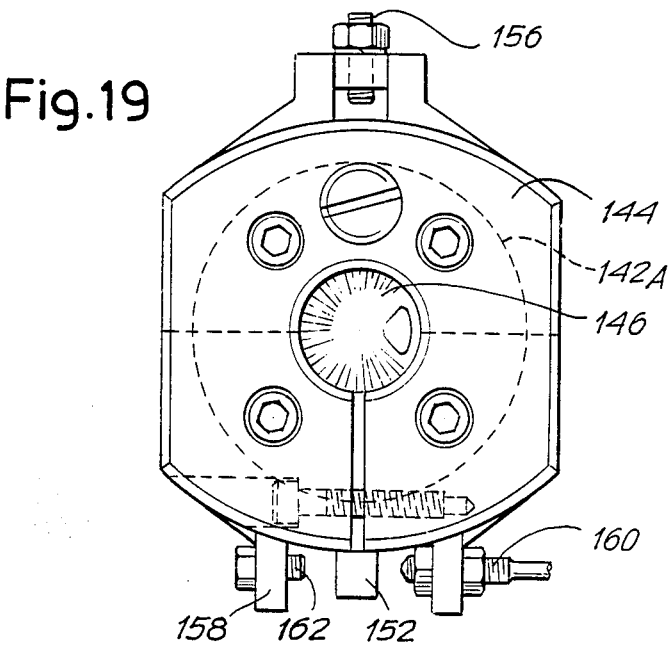
Figure 20:
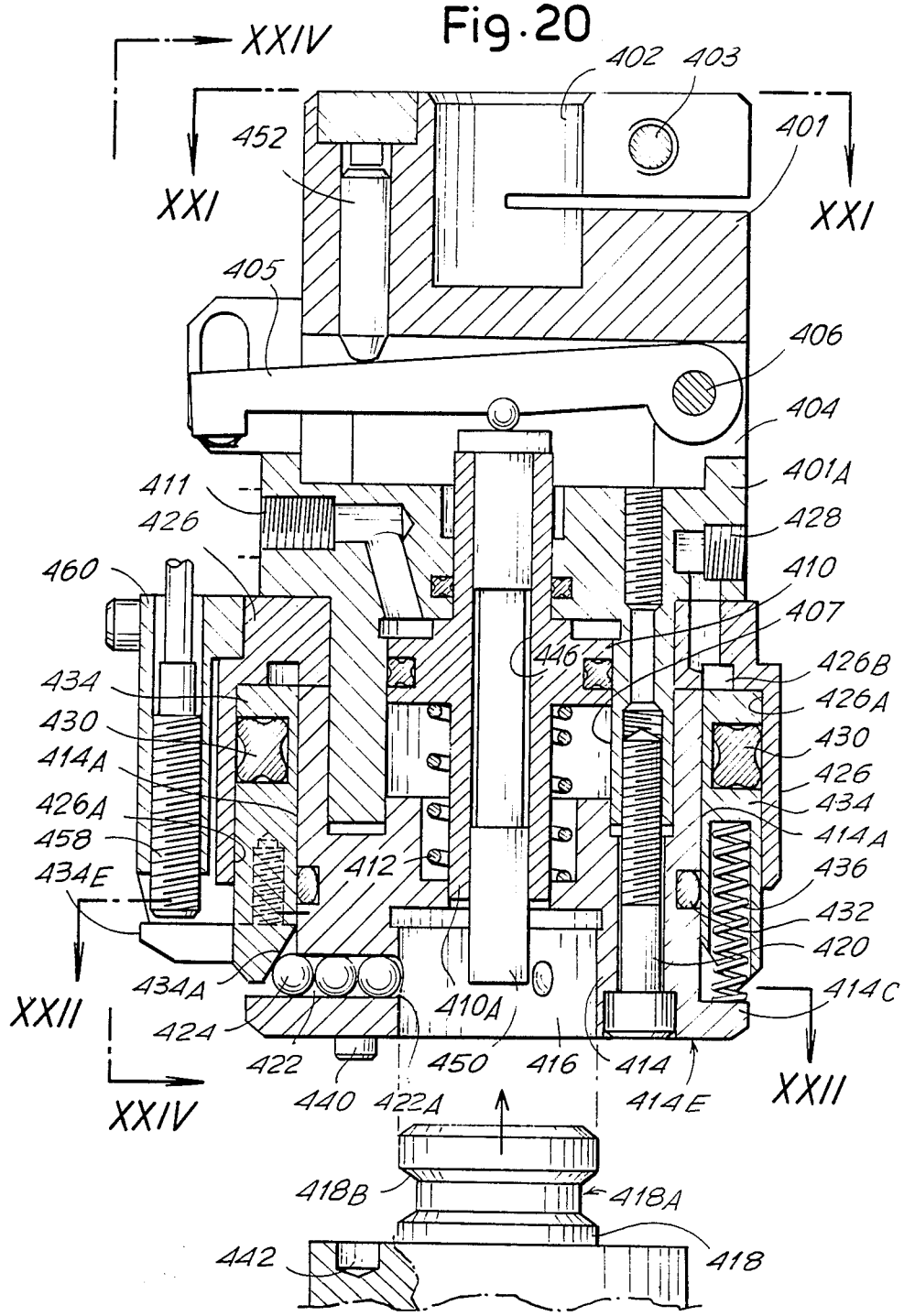
FIG. 20 shows a diametral section of a support.
Figure 21:
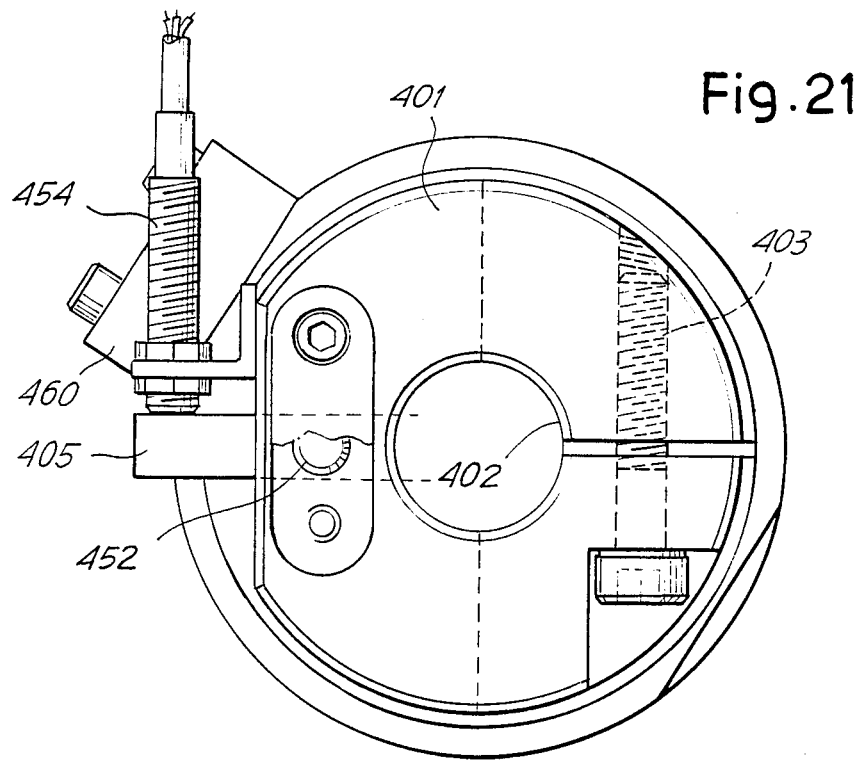
FIGS. 21 and 22 show a view and a partial section view on line XXI—XXI and a section on line XXII—XXII of FIG. 20.
Figure 22:
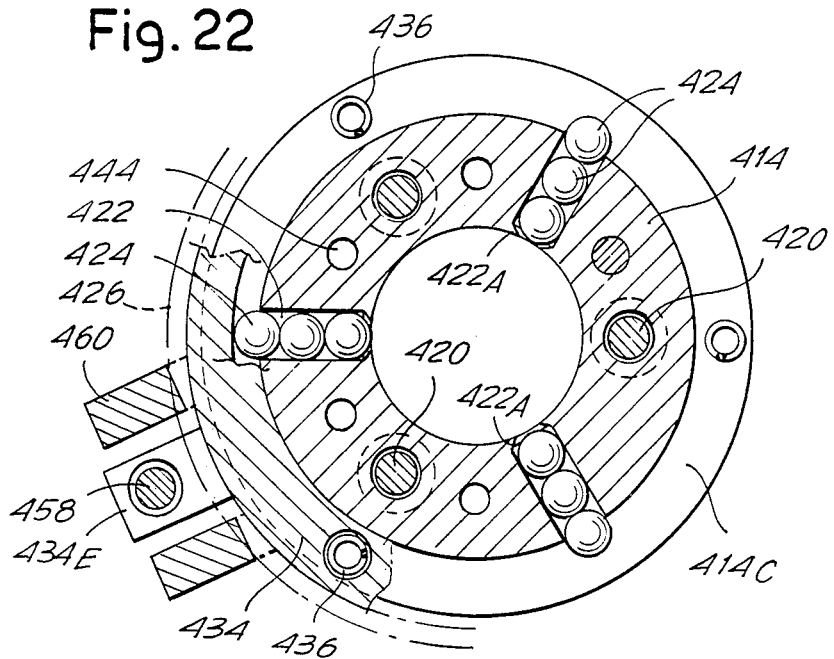
Figure 23:
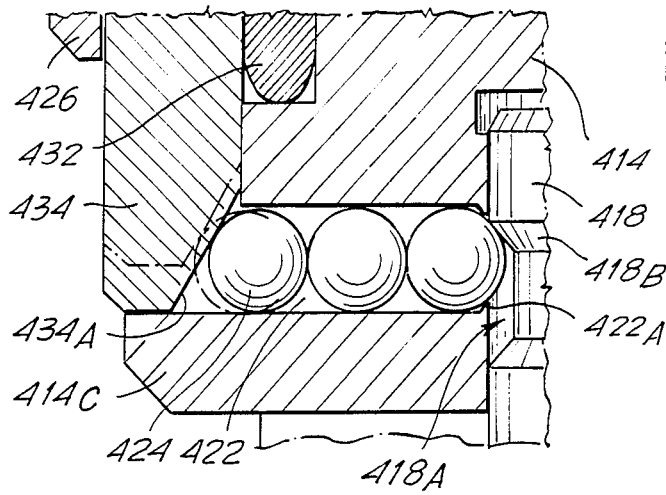
FIG. 23 shows a detail of FIG. 20 in a different arrangement.
Figure 24:
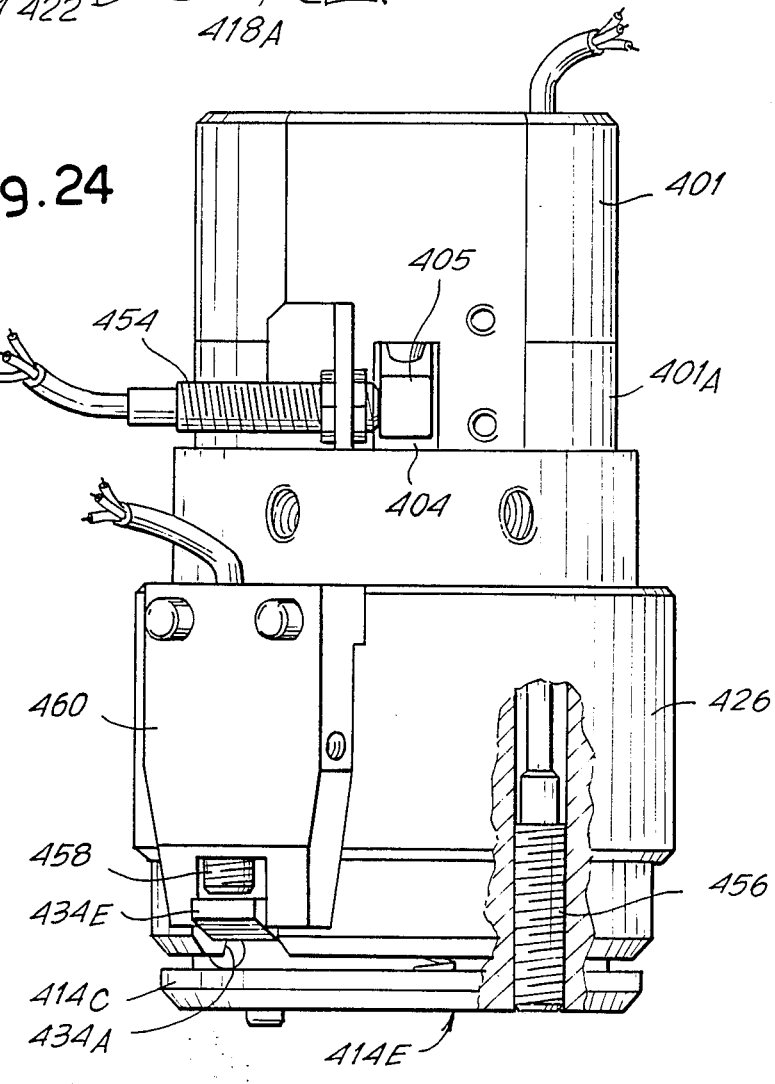
FIG. 24 is a view on line XXIV—XXIV of FIG. 1.

The presence of the mechanical hand is detected by a sensor 187 (see FIG. 18) which is housed in the piece 142B and appears at the level of the surface which comes in contact with the piece 186 of the mechanical hand 140; the possible grip failure of the grip or the mechanical hand loss is thereby signalled.

Figure 16:
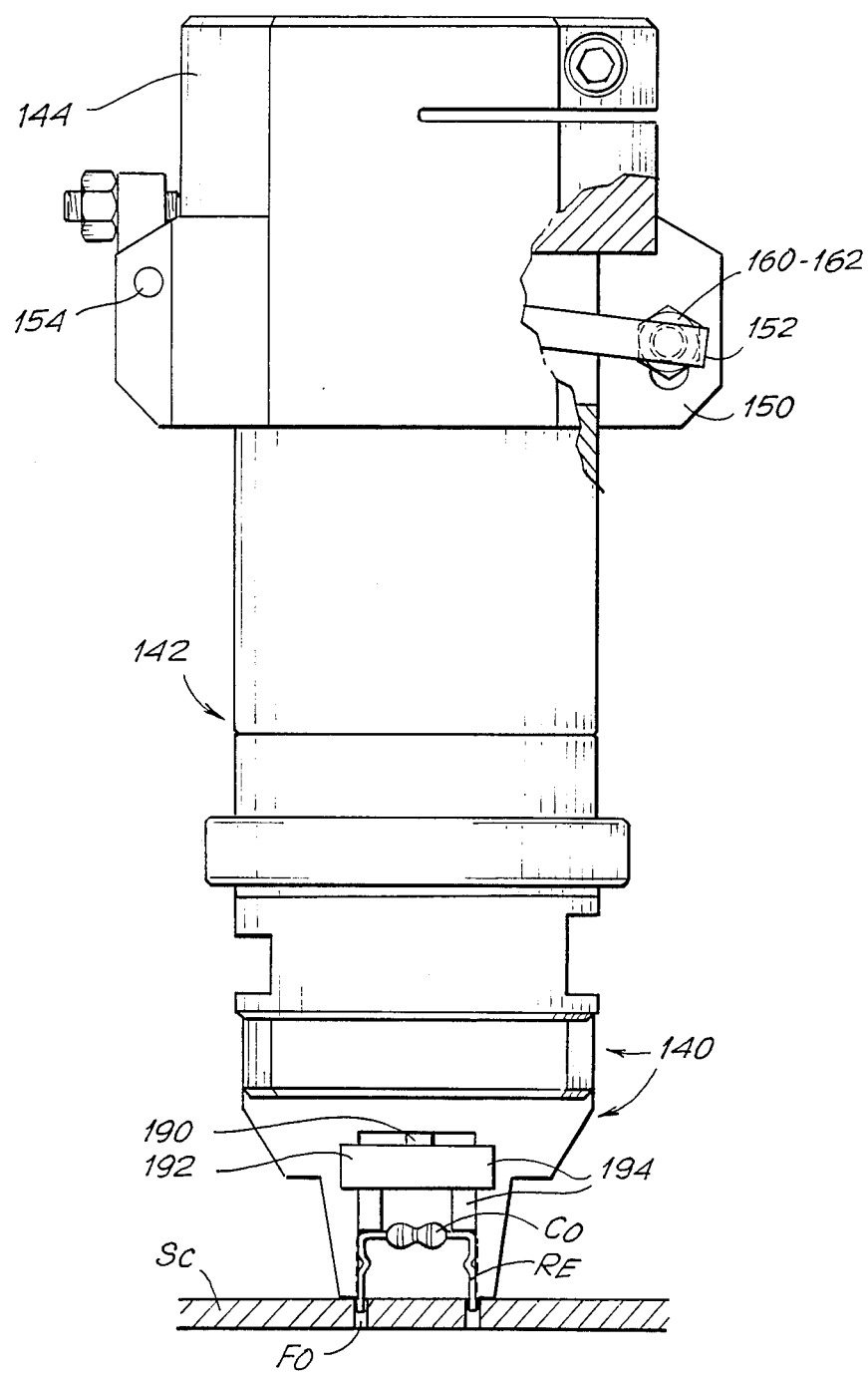
FIGS. 16 and 17 show, similarly to FIG. 13, an arrangement of initial manoeuvre of a regular application, and an arrangement of a hindered manoeuvre.
Figure 17:
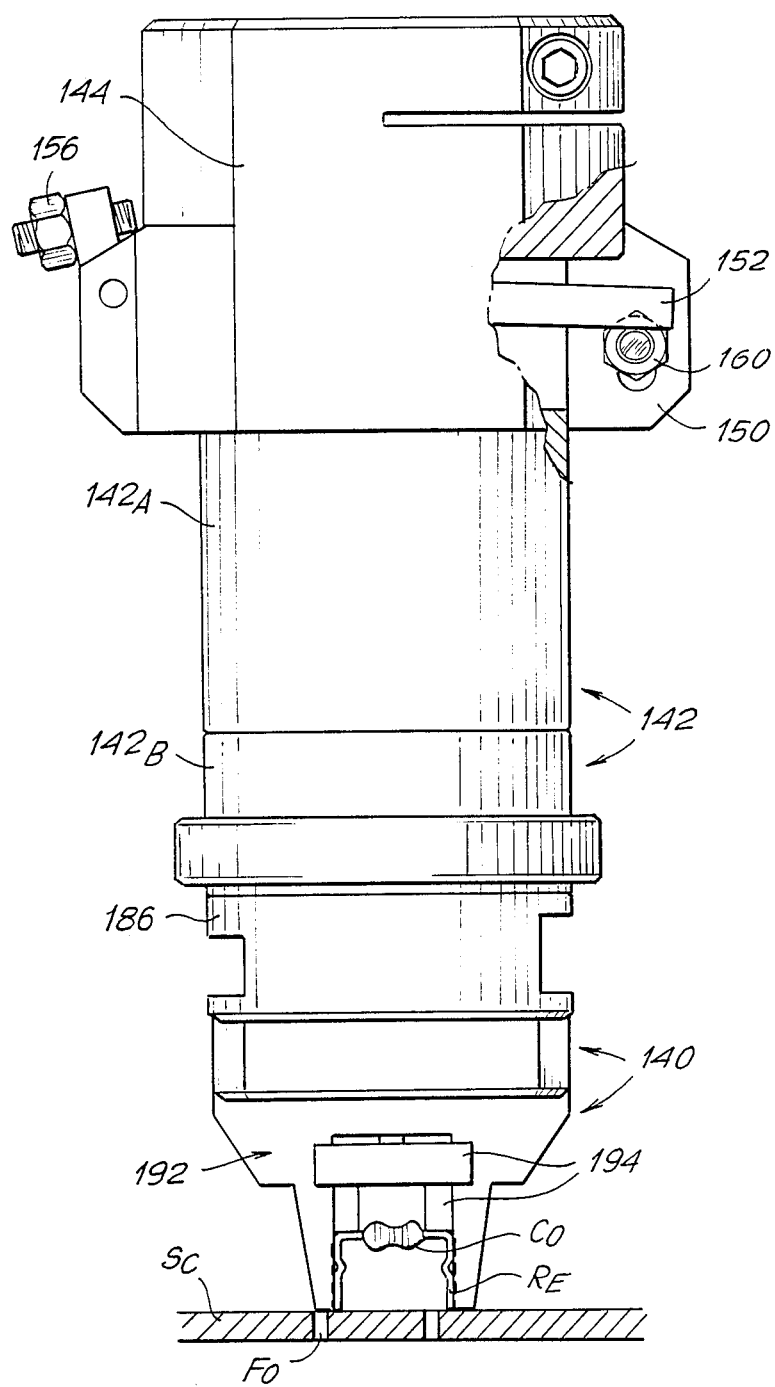

In the body 186 of the mechanical hand, a through seat 188 is predisposed which is longitudinally crossed by a manoeuvre column 190 reaching the very tool 192 in order to drive the operative members thereof; the tool is replaceable on the mechanical hand 140 respectively with the mechanical hand 140. In the illustrated example, the tool 192 comprises a mobile operative member 194 which is slidingly driven by the manoeuvring column 190. According to the diagram of FIGS. 13, 16, 17, the mobile member 194 acts on a component CO which has rheophores RE intended to be inserted into the holes FO of a card SC.

The top of column 190 is received in the dead axial end hole 168A of the sensor stem 168. This column 190 is at least partly threaded to engage an adjustable pawl 196 practically made up of a nut and a lock nut. On the pawl 196 a spring 198 from down upwards acts, reacting on the body of the mobile or mechanical hand 140, that is on the tool 192, while, on the adjustable pawl 196—after an adjustable run—both the lower end of the sensor stem 168 and the lower end of the stem 176 of the power piston 172, can act from up downwards. The assembly 190, 196 makes up the manoeuvre member of the mechanical hand.

The arrangement is such that the power piston 172 intended to carry out the operation, for example, of applying a component to a card, comes into action only if the operation can be done without meeting a resistance greater than a certain limit, since a higher resistance would involve the risk or the certainty of a damage in the component to be applied or in the support to which it is to be applied or, anyway, of an incorrect operation. To this aim, after the mechanical hand has been placed in an operative position—the lever 152 being in the lifted position shown in FIG. 14—the small piston 164 is urged causing the lowering of the lever 152.

Figure 14:
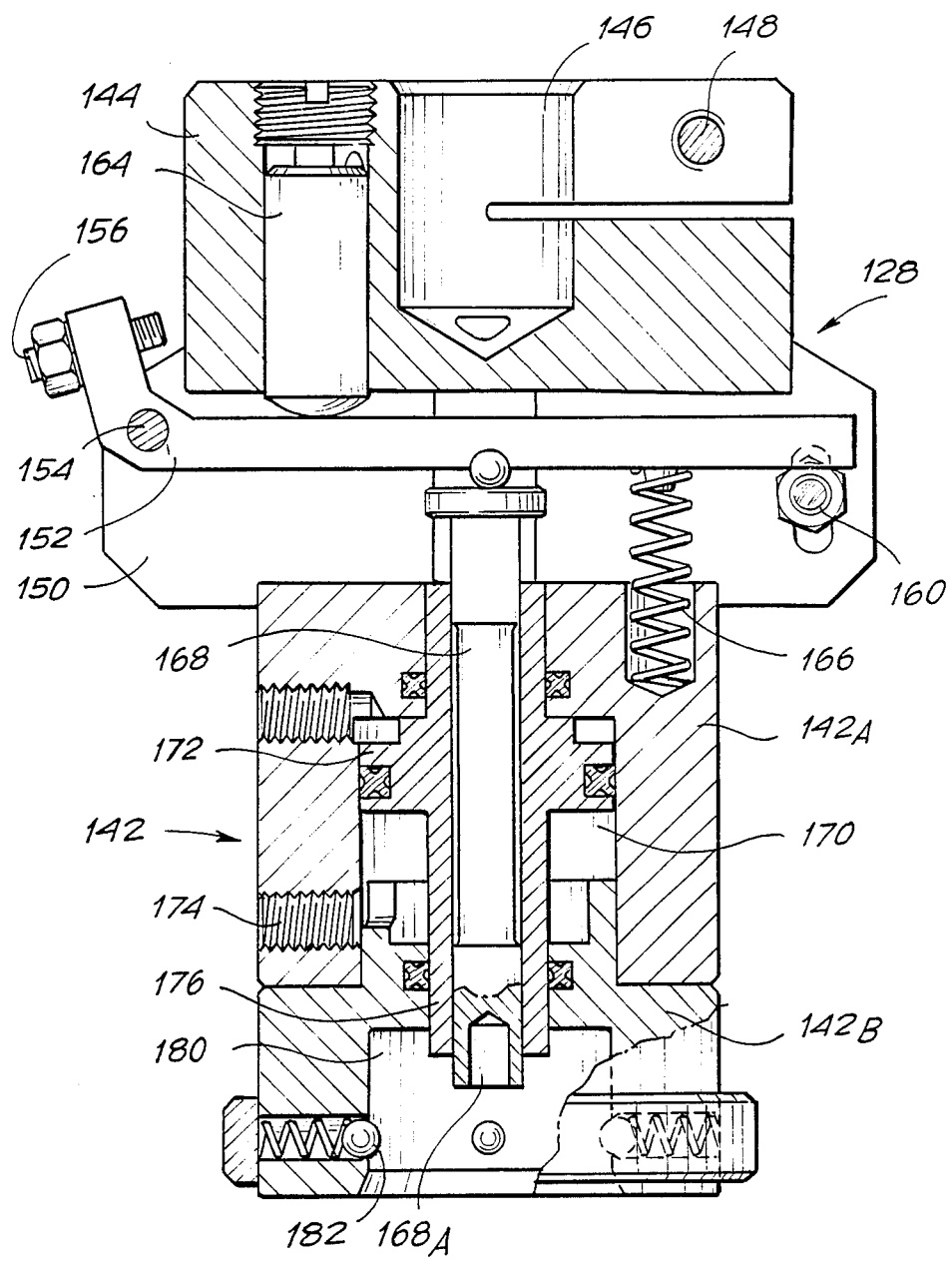
FIGS. 14 and 15 show, in axial section, two enlarged portions of the assembly of FIG. 13.
Figure 15:
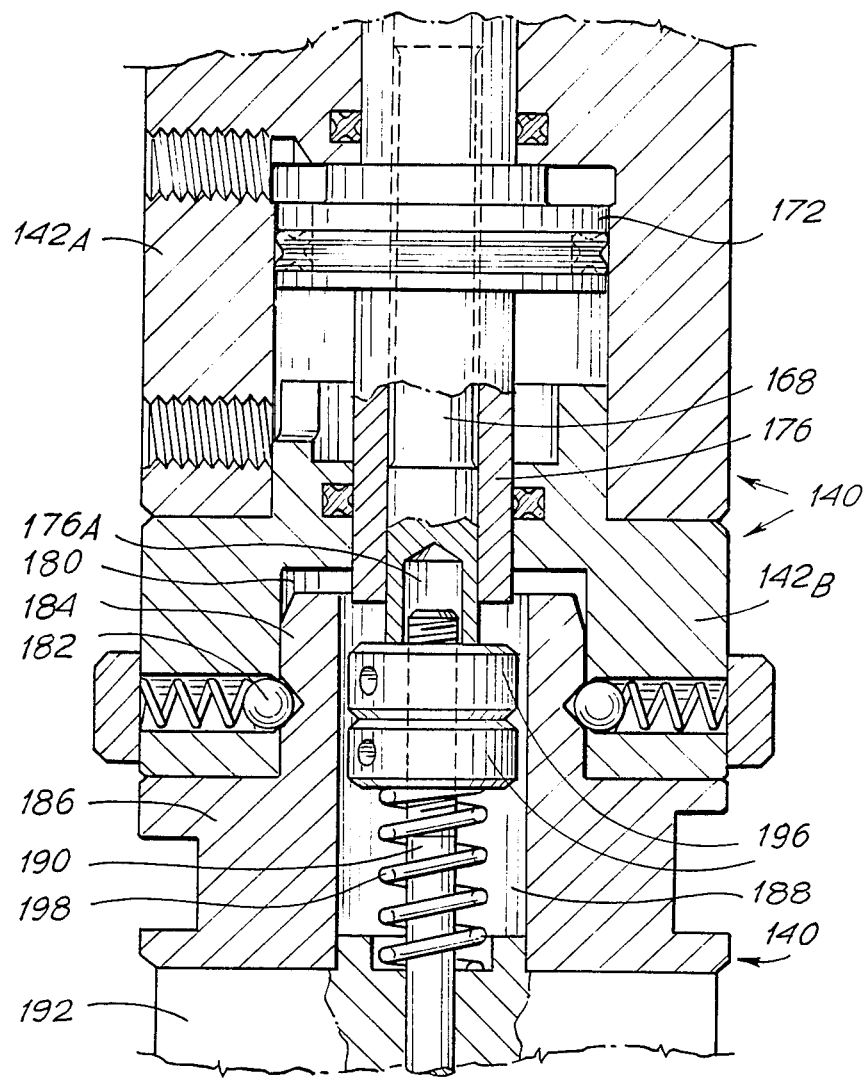

Under normal conditions, that is, with a correct relative positioning for carrying out the desired operation, as indicated in FIG. 13 for the component CO, the lever 152 may duly lower around its articulation 154 as the lower end of the sensor stem 158, by acting on the pawl 196, lowers the column 190 until the rheophores RE of component CO go into the seats FO suitably predisposed in the card support SC or the like (see FIG. 14). Under these conditions, the displacement of the lever element 152 is such as to cause the interception of the optical sight 160, 162 and to determine therefore a consensus to the activation of the power piston system 170, 172. This activation causes the lower of the power piston 172 and of its tubular stem 176 which comes in contact with the adjustable pawl 196 and causes the operative run of column 190 and mobile members 194 of the tool 192 to complete the operation established for the applied mechanical hand 140, in this example, the operation of the complete insertion of rheophores RE into the holes FO.

In anomalous conditions, that is, with an incorrect relative positioning for the operation to be carried out (as indicated for example in FIG. 17), the sensor stem 168 and the lever 152 cannot be lowered as far as the interception of the sight 160, 162 and, therefore, the consensus to the power piston system 170, 172 is not given. This failed consensus depends on the fact that the sensor stem 168 being pushed to lower by the lever element 152 with a relatively very weak force (which in practice has to win only the action of spring 198), does not overcome the resistance which occurs at the beginning of the movement of the tool mobile members, like those indicated by 194, owing to the positioning irregularity (FIG. 17) and thus to the obstacle to a free lowering of column 190. The force exerted on the sensor stem 168 is, however, so limited so as to avoid any kind of damage to the component (like CO, RE) which should have been applied, as well as to the members of the mechanical hand or, in any case, of the apparatus. The failure consensus of the lever 152—which does not act on the optical sight 160, 162 or equivalent—may determine the stoppage of the plant accompanied by possible signallings and/or operations apt to carry out measures consequent on the detected irregularity.

Also in this case it is possible to provide a limit device of the push between members 196 and 176A, or, in a different arrangement between mutually pushing members.

According to what is illustrated in the drawing, numeral 401 indicates the fitting block having a seat 402 for the fitting on the head of the end of the robot arm, to which seat said block can be tightened for example, by the tangential screw 403. Between the block 401 and its lower portion 401A, a diametral seat 404 is formed for a lever 405 having its fulcrum at 406 and cooperating with an axial sensor to be described below. The lower portion 401A of block 401 forms a cylindrical cavity 407 into which a single-acting piston 410 can slide—with a feeding connection 411 and with a spring—(or a double-acting piston), whose stem 410A slides through a block 414 to reach a cavity 416, which serves to fit the shank 418 of the very tool U. This shank 418 has an angular groove 418A having isosceles triangle outline and, however, with a conical bank 418B for the purposes indicated below. The block 414 is secured to the block 401, 401A by means of screws 420. In the block 414 three cylindrical radial seats 422 are formed, which enter the cavity 416 with a slight reduction in diameter formed in each seat 422 by a small collar 422A; this collar is apt to retain a tern of balls 424 which is housed in the respective seat 422 being axially mobile therein. The balls 424 may project in the cavity 416 to retain the shank 418 by acting on the truncated-cone wall 418B. The shank 418 is therefore centrally retained by the centripetal thrust of the three terns of balls 424. In order to centripetally push these balls to said locking position, a fluid-operated control system is provided— —and in particular, compressed air-operated—which is described below.

The block 414 makes up—with its outer cylindrical skirt 414A—the inner face of an annular cylinder whose outer concave surface 426A is formed by a piece 426 which is fitted on the block 401 and tightened between this block and the block 414 by the screws 420. The two cylindrical surfaces 414A and 426A form a cylinder of annular section completed by the annular cavity 426B which is formed in the piece 426 and can be reached by the control fluid fed through a connection 428. Numerals 430 and 432 indicate two seals cooperating to assure a sealing condition between the above described cylinder having annular section and an annular piston 434 which is slidingly inserted in this cylinder. The piston 434 is urged by three springs 436, which are housed within axial holes evenly distributed on the piston 434 and which react on a lower end flange 414C of block 414, this flange being lined up with the three radial seats 422. The annular piston 434 has in its lower part an inner conical surface 434A which comes in contact with the outer ball of each of the three terns of balls 424 housed in the three seats 422. The arrangement is such that, by feeding fluid under pressure from the connection 428 to the cavity 426B and then into the cylinder with annular section, the piston 434 is pushed downwards against the action of springs 436 and caused to push—through the truncated-cone surface 434A—the balls 424 in the centripetal direction in order to engage with the inner-most balls the surface 418B of groove 418A of the tool shank 418, if present, and to block the latter with a relatively strong force. In case a shank 418 is no present in the cavity 416, the piston 434 when is pushed downwards comes into contact with the flange 414C (FIG. 4) before the balls 424 are pressed onto the edges 422A which, therefore, are never forced. The thrust on balls 424 is relatively very high, both because the conformation of the cylinder-annular piston system 426A, 414A, 434 assures a very large fluid pressure surface, and because the inclination of the truncated cone surface 434A multiplies the thrust on the balls.

The described locking device permits to quickly release a tool U associated with the shank 418 and the lock, in a very strong and self-centering manner, the shank and thus the tool, by also axially forcing it against the surface 414E. All that is obtained together with a high retaining power, very limited dimensions and through a device of low cost servicing and relatively economical production. In the coupling of shank 418, the tool rests against the lower surface 414E of the block 414 and is centered by the presence of a pin 440 which may have a seat in a suitable housing 442 of the support surface of tool U against the surface 414E. In addition, there is the possibility of feeding the tool U members by the control fluid through passages 444 dug in the blocks 401 and 414 and which are in correspondence, on the surface 414E, with relevant passages in the body of tool U.

In the stem 410A a passage 446 is dug in which an axial sensor stem 450 slides projecting downwards into the cavity 416 and acting with its upper part on the lever 405 against the action of a small spring such as a pneumatic spring generated by a small piston 452 which can also act as a position sensor of the lever 405. The outer mobile end of lever 405 cooperates with a proximity sensor 452 which controls the lower position and the lifting of the lever and thus of the sensor. This allows to evaluate the presence of the shank 418 or even to sense the possible initial resistance to the insertion of a component on its support, prior to the intervention of the power actuator controlled by piston 410, 410A.

Another sensor 456 is provided for detecting, on the surface 414E, the presence of the contacting surface of tool U.

Still another sensor 458 may be provided in a side body 460; said sensor cooperates with an external appendix 434E of the annular piston 434 to indicate the position of the latter, in order to evaluate the release conditions of the clamp.

The drawing shows exemplifications given only as a practical demonstration of the invention which may vary in the forms and dispositions. The possible presence of reference numbers in the appended claims has the purpose of facilitating the reading of the claims, reference being made to the description and drawing and has not, therefore, the purpose to put limits to the scope of the protection pointed out by the claims.

We claim:

1. A Tool/Body assembly for a robot arm or the like comprising;
    body means having a cylindrical cavity for receiving the shank of a tool, fluid passages, seat means extending radially outwardly from said cavity to the periphery of said body, and ball means moveably disposed within said seat means;
    annular piston means surrounding said body means and being slideably disposed along said body means, said annular piston means including surfaces disposed proximate to said seat means and acting upon said ball means to urge said ball means towards said cavity; and
    said tool including a cylindrical shank for reception within said cavity of said body means and said shank including a peripheral groove for receiving said ball means, said ball means being urged by said unnular piston means into engagement with said peripheral groove of said tool shank to releasably attach said tool to said body means and fluid passages for fluid communication with said fluid passages disposed in said body means.

2. The assembly as claimed in claim 1 wherein said peripheral groove of said tool shank includes walls coverging towards the center of said shank to thereby provide an axial thrust component to force said tool into engagement with said body as said ball means are received in said groove.

3. The assembly as claimed in claim 1 wherein said annular piston means includes a conical end surface for engagement with said ball means to urge same into engagement with said groove of said tool shank.

4. The assembly as claimed in claim 1 further including stop means disposed on said body means to limit the travel of said annular piston to prevent engagement between said piston and said ball means when no tool is inserted.

5. The assembly as claimed in claim 1 further including sensor means disposed on said body for detecting the position of said annular piston.

6. The assembly as claimed in claim 5 wherein said annular piston includes an appendix for contacting said sensor means disposed on said body.

7. The assembly as claimed in claim 1 wherein said body means includes three equi-angularly spaced seat means for receiving said ball means.

8. The assembly as claimed in claim 1 further including means for urging said annular piston means into engagement with said ball means.

* * * * *